United States Patent
Nie et al.

(10) Patent No.: US 12,469,295 B2
(45) Date of Patent: Nov. 11, 2025

(54) METHOD AND DEVICE FOR ACQUIRING INFORMATION, AND SYSTEM FOR DETECTING ATTENTION DEGREE

(71) Applicants: BEIJING WODONG TIANJUN INFORMATION TECHNOLOGY CO., LTD., Beijing (CN); BEIJING JINGDONG CENTURY TRADING CO., LTD., Beijing (CN)

(72) Inventors: Mingjun Nie, Beijing (CN); Jingjing Wang, Beijing (CN); Jiangxu Wu, Beijing (CN); Miaofeng Hu, Beijing (CN); Shiwei Ma, Beijing (CN); Ran Zhang, Beijing (CN)

(73) Assignees: BEIJING WODONG TIANJUN INFORMATION TECHNOLOGY CO., LTD., Beijing (CL); BEIJING JINGDONG CENTURY TRADING CO., LTD, Beijing (CN)

( * ) Notice: Subject to any disclaimer, the term of this patent is extended or adjusted under 35 U.S.C. 154(b) by 379 days.

(21) Appl. No.: 17/999,971

(22) PCT Filed: May 13, 2021

(86) PCT No.: PCT/CN2021/093517
§ 371 (c)(1),
(2) Date: Nov. 28, 2022

(87) PCT Pub. No.: WO2021/238664
PCT Pub. Date: Dec. 2, 2021

(65) Prior Publication Data
US 2023/0206642 A1   Jun. 29, 2023

(30) Foreign Application Priority Data
May 29, 2020   (CN) .......................... 202010479278.7

(51) Int. Cl.
*G06V 20/52* (2022.01)
*G06F 16/215* (2019.01)
(Continued)

(52) U.S. Cl.
CPC ............ *G06V 20/52* (2022.01); *G06F 16/215* (2019.01); *G06F 16/285* (2019.01); *G06V 10/70* (2022.01);
(Continued)

(58) Field of Classification Search
None
See application file for complete search history.

(56) References Cited

U.S. PATENT DOCUMENTS 8,295,597 B1   10/2012   Sharma et al.
9,779,309 B1 *  10/2017   Fink .................... G06F 16/7867
(Continued)

FOREIGN PATENT DOCUMENTS

CN   105320653 A   2/2016
CN   106156970 A   11/2016
(Continued)

OTHER PUBLICATIONS

Paolanti, M., Pietrini, R., Mancini, A., Frontoni, E., & Zingaretti, P. (2020). Deep understanding of shopper behaviours and interactions using RGB-D vision. Machine Vision and Applications, 31, 1-21. (Year: 2020).*
(Continued)

*Primary Examiner* — Ian L Lemieux
(74) *Attorney, Agent, or Firm* — Myers Bigel, P.A.

(57) ABSTRACT

The present disclosure provides an information acquiring method and apparatus, and an attention degree detecting system. The information acquiring method includes: acquiring a video frame captured by a video capturing equipment detecting whether a pedestrian exists in the video frame by
(Continued)

using a first deep-learning model; processing the video frame by using a second deep-learning model to generate a pedestrian bounding box of the pedestrian under a condition that the pedestrian exists in the video frame, and assigning a corresponding pedestrian identifier to the pedestrian bounding box; identifying an image in the pedestrian bounding box by using a third deep-learning model to identify feature information of the pedestrian; and writing a pedestrian historical data into a database, wherein the pedestrian historical data comprises a timestamp and an identifier of the video frame, coordinate information of the pedestrian bounding box, the pedestrian identifier and the feature information of the pedestrian.

9 Claims, 5 Drawing Sheets

(51) Int. Cl.
*G06F 16/28* (2019.01)
*G06V 10/70* (2022.01)
*G06V 20/40* (2022.01)
*G06V 40/10* (2022.01)
*G06V 40/20* (2022.01)

(52) U.S. Cl.
CPC .............. *G06V 20/46* (2022.01); *G06V 40/10* (2022.01); *G06V 40/20* (2022.01)

(56) References Cited

U.S. PATENT DOCUMENTS

| | | | |
|---|---|---|---|
| 10,262,331 | B1 | 4/2019 | Sharma et al. |
| 10,275,683 | B2 | 4/2019 | Zhu et al. |
| 11,481,805 | B2* | 10/2022 | Glaser .................... G06V 20/52 |
| 11,869,065 | B1* | 1/2024 | Eledath ................. G06V 40/28 |
| 2016/0048738 | A1 | 2/2016 | He et al. |
| 2018/0204093 | A1* | 7/2018 | Zhu ....................... G06V 10/762 |
| 2019/0108561 | A1* | 4/2019 | Shivashankar ...... G06V 40/103 |
| 2020/0380701 | A1* | 12/2020 | Buibas ................. G06V 40/103 |
| 2021/0365961 | A1* | 11/2021 | Marshall ............ G06Q 30/0201 |
| 2022/0180534 | A1* | 6/2022 | Sun ........................... G06T 7/292 |
| 2022/0230216 | A1* | 7/2022 | Buibas ................. G06V 10/454 |
| 2022/0351535 | A1* | 11/2022 | Tao ..................... G06F 18/2413 |
| 2023/0133882 | A1* | 5/2023 | Nam ...................... G06V 20/52 348/77 |
| 2023/0134967 | A1* | 5/2023 | Francesca ............. G06V 40/20 382/103 |
| 2023/0401895 | A1* | 12/2023 | Onozato ................ G06V 20/52 |

FOREIGN PATENT DOCUMENTS

| | | | | |
|---|---|---|---|---|
| CN | 106682637 | A | 5/2017 | |
| CN | 106845374 | A | 6/2017 | |
| CN | 107909443 | A | 4/2018 | |
| CN | 108175227 | A | 6/2018 | |
| CN | 108647242 | A | 10/2018 | |
| CN | 108898109 | A | 11/2018 | |
| CN | 109146576 | A | 1/2019 | |
| CN | 208689391 | U | 4/2019 | |
| CN | 109902550 | A | 6/2019 | |
| CN | 110942055 | A | 3/2020 | |
| CN | 110956069 | A * | 4/2020 | ......... G06K 9/00362 |
| CN | 110991261 | A | 4/2020 | |
| CN | 112307871 | A | 2/2021 | |
| JP | 2018097412 | A | 6/2018 | |
| JP | 2018195017 | A | 12/2018 | |
| JP | 2019133530 | A | 8/2019 | |
| JP | 2019197353 | A | 11/2019 | |

OTHER PUBLICATIONS

Yolcu, G., Oztel, I., Kazan, S., Oz, C., & Bunyak, F. (2020). Deep learning-based face analysis system for monitoring customer interest. Journal of ambient intelligence and humanized computing, 11, 237-248. (Year: 2019).*
Dinh Nguyen, T., Hihara, K., Cao Hoang, T., Utada, Y., Torii, A., Izumi, N., . . . & Tran, L. Q. (2023). Retail store customer behavior analysis system: Design and Implementation. arXiv e-prints, arXiv-2309. (Year: 2023).*
Liu, J., Gu, Y., & Kamijo, S. (2017). Customer behavior classification using surveillance camera for marketing. Multimedia Tools and Applications, 76, 6595-6622. (Year: 2017).*
Senior, A. W., Brown, L., Hampapur, A., Shu, C. F., Zhai, Y., Feris, R. S., . . . & Carlson, C. (Sep. 2007). Video analytics for retail. In 2007 IEEE conference on advanced video and signal based surveillance (pp. 423-428). IEEE. (Year: 2007).*
"Second Office Action and English language translation", CN Application No. 202010479278.7, Jan. 4, 2024, 13 pp.
"Communication with Supplementary European Search Report", EP Application No. 21813171.2, May 31, 2024, 10 pp.
Liciotti, Daniele , et al., "An automatic analysis of shoppers behaviour using a distributed RGB-D cameras system", 2014 IEEE/ASME 10th International Conference on Mechatronic and Embedded Systems and Applications (MESA), Senigallia, Italy, Sep. 10, 2014, 6 pp.
Wang, Hongbo , et al., "A Comprehensive Overview of Person Re-Identification Approaches", IEEE Access, vol. 8, Mar. 3, 2020, pp. 45556-45583.
"International Search Report and Written Opinion of the International Searching Authority", International Application No. PCT/CN2021/093517, Aug. 12, 2021, 17 pp.
Notice of Rejection Reasons and English language translation, JP Application No. 2022-573607, Mar. 25, 2025, 16 pp.
Ahmed, et al., "An Improved Deep Learning Architecture for Person Re-Identification", 2015 IEEE Conference on Computer Vision and Pattern Recognition (CVPR), Boston, MA, Jun. 7, 2015.
Oami, et al., "Trends in Image Analysis Technology for Security and Marketing Applications", Journal of the Society of Image Information Media, vol. 70, No. 1, Society of Image Information Media, Jan. 1, 2016, pp. 63-69.

* cited by examiner

METHOD AND DEVICE FOR ACQUIRING INFORMATION, AND SYSTEM FOR DETECTING ATTENTION DEGREE

CROSS-REFERENCE TO RELATED APPLICATIONS

The present disclosure is a U.S. National Stage Application under 35 U.S.C. § 371 of International Patent Application No. PCT/CN2021/093517, filed on May 13, 2021, which is based on and claims priority from CN application No. 202010479278.7, filed on May 29, 2020, the disclosure of both of which are hereby incorporated herein by reference in their entirety.

TECHNICAL FIELD

The present disclosure relates to the field of information processing, and in particular, to an method and apparatus for acquiring information, and a system for detecting an attention degree.

BACKGROUND

In offline stores, data and respective statistic results showing whether each shelf is disposed in a proper position, whether it attracts sufficient attention degree from users and what kind of customers are most attracted by it are effective data basis for adjusting the layout of the shelves in the store, optimizing the layout of commodities in the store and guiding the selection of the commodities. If these data can be collected, a merchant can adjust in-store layout and optimize the display of commodities conveniently, and it is also helpful for a brand owner to select a proper shelf to display the goods of the brand.

At present, the merchant's knowledge of the level of attention degree paid to a shelf is mainly based on manually observing customers' behavior in front of the shelf, or reversely deducing the level of attention degree paid to the shelf by using the quantity of the goods sold in the shelf area.

SUMMARY

According to a first aspect of an embodiment of the present disclosure, an information acquiring method is provided. The information acquiring method comprising: acquiring a video frame captured by a video capturing equipment; detecting whether a pedestrian exists in the video frame by using a first deep-learning model; processing the video frame by using a second deep-learning model to generate a pedestrian bounding box of the pedestrian under a condition that the pedestrian exists in the video frame, and assigning a corresponding pedestrian identifier to the pedestrian bounding box; identifying an image in the pedestrian bounding box by using a third deep-learning model to identify feature information of the pedestrian; and writing a pedestrian historical data into a database, wherein the pedestrian historical data comprises a timestamp of the video frame, an identifier of the video frame, coordinate information of the pedestrian bounding box, the pedestrian identifier and the feature information of the pedestrian.

In some embodiments, grouping all pedestrian historical data in the database according to the pedestrian identifier to obtain a plurality of first groups after writing the pedestrian historical data into the database; performing a first deduplication processing on all pedestrian history data in each first group to retain only one piece of pedestrian historical data among a plurality of pieces of pedestrian historical data which have same feature information and have intervals between the timestamps of video frames smaller than a time threshold.

In some embodiments, grouping all pedestrian historical data in the database according to a generation time of the video frames to obtain a plurality of second groups after writing the pedestrian historical data into the database; performing a second deduplication processing on all pedestrian history data in each second group to retain only one piece of pedestrian historical data among a plurality of pieces of pedestrian historical data in which a distance between center positions of the pedestrian bounding boxes is smaller than a distance threshold.

In some embodiments, the assigning the corresponding pedestrian identifier to the pedestrian bounding box comprises: identifying pedestrian feature information in the pedestrian bounding box by using a second deep-learning model; retrieving whether the pedestrian feature information is comprised in a pedestrian feature library; writing the pedestrian feature information into the pedestrian feature library under a condition that the pedestrian feature information is not comprised in the pedestrian feature library, and assigning a new pedestrian identifier to the pedestrian bounding box.

In some embodiments, the assigning the corresponding pedestrian identifier to the pedestrian bounding box comprises: assigning a pedestrian identifier associated with the pedestrian feature information in the pedestrian feature library to the pedestrian bounding box under a condition that the pedestrian feature information is comprised in the pedestrian feature library.

In some embodiments, discarding the video frame under a condition that there is no pedestrian in the video frame.

In some embodiments, the feature information of the pedestrian comprises behavior feature information of the pedestrian.

In some embodiments, the behavior feature information of the pedestrian comprises at least one of walking, staying, taking, putting back and holding.

In some embodiments, the feature information of the pedestrian comprises attribute feature information of the pedestrian.

In some embodiments, the attribute feature information of the pedestrian comprises at least one of a gender of the pedestrian, an age of the pedestrian, a clothing of the pedestrian and an appearance features of the pedestrian.

According to a second aspect of the embodiments of the present disclosure, an information acquiring apparatus is provided. The information acquiring apparatus comprising: a first memory configured to store instructions; a first processor coupled to the first memory, wherein based on the instructions stored in the first memory, the first processor is configured to: acquire a video frame captured by a video capturing equipment; detect whether a pedestrian exists in the video frame by using a first deep-learning model; process the video frame by using a second deep-learning model to generate a pedestrian bounding box of the pedestrian under a condition that the pedestrian exists in the video frame, and assign a corresponding pedestrian identifier to the pedestrian bounding box; identify an image in the pedestrian bounding box by using a third deep-learning model to identify feature information of the pedestrian; and write a pedestrian historical data into a database, wherein the pedestrian historical data comprises a timestamp of the video frame, an identifier of the video frame, coordinate information of the pedestrian bounding box, the pedestrian identifier and the feature information of the pedestrian.

According to a third aspect of the embodiments of the present disclosure, an attention degree detecting system is provided. The attention degree detecting system comprising: a video capturing equipment configured to acquire video information of a predetermined area; an information acquiring apparatus, comprising: a first memory configured to store instructions; a first processor coupled to the first memory, wherein based on the instructions stored in the first memory, the first processor is configured to: acquire a video frame captured by a video capturing equipment; detect whether a pedestrian exists in the video frame by using a first deep-learning model; process the video frame by using a second deep-learning model to generate a pedestrian bounding box of the pedestrian under a condition that the pedestrian exists in the video frame, and assign a corresponding pedestrian identifier to the pedestrian bounding box; identify an image in the pedestrian bounding box by using a third deep-learning model to identify feature information of the pedestrian; and write a pedestrian historical data into a database, wherein the pedestrian historical data comprises a timestamp of the video frame, an identifier of the video frame, coordinate information of the pedestrian bounding box, the pedestrian identifier and the feature information of the pedestrian; and an attention degree detecting apparatus, comprising: a second memory configured to store instructions; a second processor coupled to the second memory, wherein based on the instructions stored in the second memory, the second processor is configured to: receive a query request for querying an attention degree of a predetermined area; extract a plurality of pedestrian historical data associated with the predetermined area from a predetermined database; determine the attention degree of the predetermined area according to timestamps and feature information of pedestrians in the plurality of pedestrian historical data.

In some embodiments, the second processor is configured to: extract a plurality of pedestrian historical data to be detected from the plurality of pedestrian historical data, wherein timestamps in the plurality of pedestrian historical data to be detected are within a predetermined time range; count the number of pieces of feature information of the pedestrians in the pedestrian historical data to be detected; determine the attention degree of the predetermined area according to the result of counting.

In some embodiments, the feature information of the pedestrian comprises behavior feature information of the pedestrian.

In some embodiments, the behavior feature information of the pedestrian comprises at least one of walking, staying, taking, putting back and holding.

In some embodiments, the feature information of the pedestrian comprises attribute feature information of the pedestrian.

In some embodiments, the attribute feature information of the pedestrian comprises at least one of a gender of the pedestrian, an age of the pedestrian, a clothing of the pedestrian and an appearance features of the pedestrian.

According to an fourth aspect of the embodiments of the present disclosure, a non-transitory computer-readable storage medium is provided, wherein the non-transitory computer-readable storage medium stores computer instructions which, when executed by a processor, implement the method according to any one of the embodiments described above.

Other features of the present disclosure and advantages thereof will become apparent from the following detailed description of exemplary embodiments thereof, which proceeds with reference to the accompanying drawings.

BRIEF DESCRIPTION OF THE DRAWINGS

The accompanying drawings, which are incorporated in and constitute a part of this specification, illustrate embodiments of the disclosure and together with the description, serve to explain the principles of the disclosure.

The present disclosure may be more clearly understood from the following detailed description with reference to the accompanying drawings, in which.

It should be understood that the dimensions of the various parts shown in the drawings are not drawn to actual scale. Further, the same or similar reference numerals denote the same or similar components.

DETAILED DESCRIPTION

Various exemplary embodiments of the present disclosure will now be described in detail with reference to the accompanying drawings. The description of the exemplary embodiments is merely illustrative and is in no way intended to limit the disclosure, its application or uses. The present disclosure may be embodied in many different forms and is not limited to the embodiments described herein. These embodiments are provided to make this disclosure thorough and complete, and will fully convey the scope of the disclosure to those skilled in the art. It should be noted that: the relative arrangement of parts and steps, the composition of materials and values set forth in these embodiments are to be construed as illustrative only and not as limiting unless otherwise specifically stated.

The use of "including" or "comprising" and the like in this disclosure is intended to mean that the elements preceding the word encompass the elements listed after the word and does not exclude the possibility that other elements may also be encompassed.

All terms (including technical or scientific terms) used herein have the same meaning as commonly understood by one of ordinary skill in the art to which this disclosure belongs unless specifically defined otherwise. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Techniques, methods, and apparatus known to one of ordinary skill in the relevant art may not be discussed in detail but are intended to be part of the specification where appropriate.

The inventors found through research that manually observing behaviors of customers in front of a shelf is a waste of human resources. Meanwhile, the manual mode is apt to cause missed or false detection, and the recorded data is difficult to meet the standard of large-scale data analysis. In addition, since the degree of attention paid to the shelf is reversely inferred according to the commodity settlement information, it is only possible to derive the attention degree of the shelf where the sold goods are located, while it impossible to obtain accurately users' selecting and attention-paying behavior as well as the degree of attention being paid, let alone obtaining the attributes of the user paying attention to the shelf, and consequently analysis cannot be performed scientifically.

Accordingly, the present disclosure provides a solution of attention degree detecting, which makes it possible to know quickly and conveniently the attention degree of a pedestrian to a shelf placed in a concerned area by identifying the feature information of the pedestrian.

Figure 1:
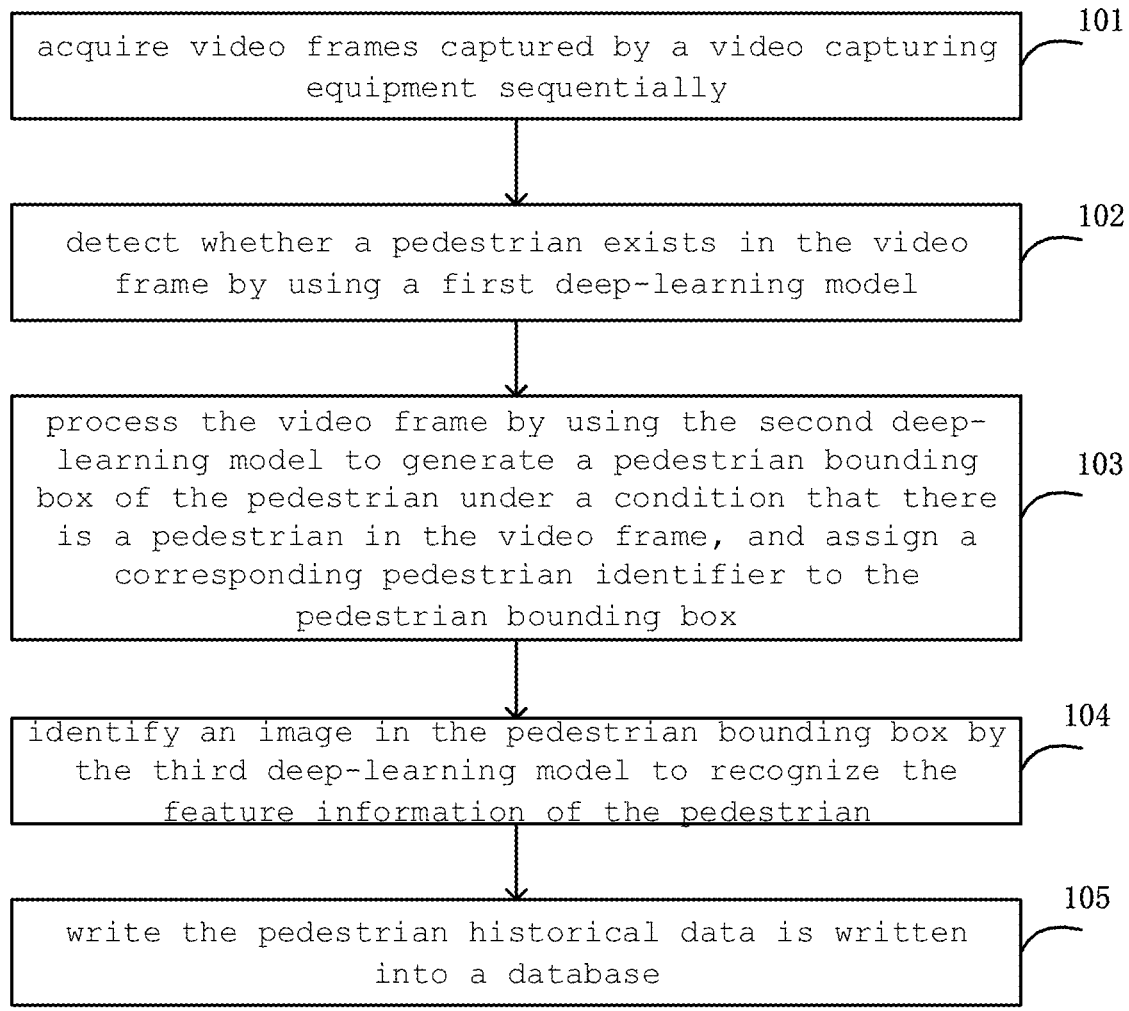
FIG. 1 is a schematic flow diagram of an information acquiring method according to one embodiment of the present disclosure.

FIG. 1 is a schematic flow diagram of an information acquiring method according to one embodiment of the present disclosure. In some embodiments, the following steps of the information acquiring method are performed by an information acquiring apparatus.

In step 101, video frames captured by a video capturing equipment are acquired sequentially.

For example, the video capturing equipment is a camera for capturing video information of a concerned area in front of a predetermined shelf.

In step 102, it is detected whether a pedestrian exists in the video frame by using a first deep-learning model.

For example, the first deep-learning model is a model such as CNN (Convolutional Neural Network), Faster-RCNN, YOLOv3, or the like.

In step 103, the video frame is processed by using the second deep-learning model to generate a pedestrian bounding box of the pedestrian under a condition that there is a pedestrian in the video frame, and a corresponding pedestrian identifier is assigned to the pedestrian bounding box.

For example, the second deep-learning model is a multi-layered CNN model.

In some embodiments, the pedestrian feature information within the pedestrian bounding box is identified by using a second deep-learning model, and it is retrieved whether the pedestrian feature information is already comprised in the pedestrian feature library. Under a condition that the pedestrian feature information is not comprised in the pedestrian feature library, the pedestrian feature information is written into the pedestrian feature library, and a new pedestrian identifier is assigned to the pedestrian bounding box.

Furthermore, under a condition that the pedestrian feature information is already comprised in the pedestrian feature library, a pedestrian identifier associated with the pedestrian feature information in the pedestrian feature library is assigned to the pedestrian bounding box.

For example, for a pedestrian P who just enters a mall or supermarket, the pedestrian feature library does not comprise feature information of the pedestrian P, therefore a new pedestrian identifier 005 needs to be assigned to the pedestrian bounding box of the pedestrian P. The pedestrian P takes the goods from shelf A and then walks to shelf B. Since the feature information of the pedestrian P is already comprised in the pedestrian feature library, the pedestrian identifier assigned to the pedestrian bounding box of the pedestrian P is still 005.

In some embodiments, a video frame is discarded under a condition that there are no pedestrians in the video frame. By discarding video frames without pedestrians, computational burden can be effectively reduced.

In step 104, an image in the pedestrian bounding box is identified by the third deep-learning model to recognize the feature information of the pedestrian.

For example, the third deep-learning model is a multi-layered CNN model.

In some embodiments, the feature information of the pedestrian comprises attribute feature information and behavior feature information of the pedestrian.

For example, the attribute feature information of the pedestrian comprises at least one of a gender of the pedestrian, an age of the pedestrian, a clothing of the pedestrian and an appearance features of the pedestrian. The behavior feature information of the pedestrian comprises at least one of walking, staying, taking, putting back and holding.

At step 105, the pedestrian historical data is written into a database, wherein the pedestrian historical data comprises a timestamp of the video frame, an identifier of the video frame, coordinate information of the pedestrian bounding box, the pedestrian identifier and the feature information of the pedestrian.

For example, the pedestrian historical data may be as shown in TABLE 1.

TABLE 1

| Time stamp | Video frame number | Coordinates of the Pedestrian bounding box | Pedestrian ID | Pedestrian attributes | Pedestrian behavior |
| --- | --- | --- | --- | --- | --- |
| 32478454 | X | (x1, y1, x2, y2) | 000001 | Gender: 1<br>Age: 3<br>Long hair: 0 | 3<br>(taking) |
| 32478454 | X | (x3, y3, x4, y4) | 000005 | Gender: 0<br>Age: 2<br>Long hair: 1 | 2<br>(staying) |
| ... | ... | ... | ... | ... | ... |

In the information acquiring method provided by the above embodiment of the present disclosure, the coordinate information of the pedestrian bounding box in the video frame, the pedestrian identifier, and the feature information of the pedestrian are recorded in the database, thereby querying the attention degree of different pedestrians to the predetermined area by using the database.

In some embodiments, the data is subjected to deduplication processing in a time dimension and a space dimension after the pedestrian historical data is written into the database, thereby reducing a storage space occupied by the database.

In some embodiments, the pedestrian historical data in the database is grouped by pedestrian identifier. And a first deduplication processing is performed on each group of pedestrian historical data to retain only one piece of pedestrian historical data in a plurality of pieces of pedestrian historical data which have same feature information and have intervals between the timestamps of video frames smaller than a time threshold.

For example, the pedestrian historical data in the database is grouped by the pedestrian identifier, such that the pedestrian historical data in each group has the same pedestrian identifier. Next, the pedestrian historical data in each group is sorted by the timestamp of the video frame, and pieces of data having a time interval smaller than a predetermined threshold (for example, 500 ms) are regarded as corresponding to the same action. In this case, only one of the pieces of data is retained. For example, the last pedestrian historical data collected is retained.

In some embodiments, the pedestrian historical data in the database is grouped by a generation time of the video frame. A second deduplication processing is performed on each group of pedestrian historical data such that only one piece of pedestrian historical data is retained among a plurality of pieces of pedestrian historical data in which the distance between the center positions of the pedestrian bounding boxes is smaller than a distance threshold.

For example, the pedestrian historical data in the database are grouped according to the generation time of the video frame such that the pedestrian historical data in each group are generated at the same time. Next, in each group, the center position of the pedestrian bounding box in each pedestrian historical data is calculated, respectively. For a plurality of pieces of pedestrian historical data in which the distance between the center positions of the pedestrian bounding boxes is less than a predetermined threshold, it may be regarded as a repeated pedestrian bounding box. In this case, only one of the pieces of data is retained. For example, the last pedestrian historical data collected is retained.

Through the above-described deduplication process, the corresponding pedestrian historical data may be as shown in TABLE 2.

TABLE 2

| Timestamp | Pedestrian ID | Coordinates of the Pedestrian bounding box | Pedestrian attributes | Pedestrian motion |
|---|---|---|---|---|
| 32478454 | 000001 | (x1, y1) | Gender: 1 Age: 3 Long hair: 0 | 3 (taking) |
| 32479032 | 000001 | (x3, y3) | Gender: 1 Age: 3 Long hair: 0 | 4 (putting back) |
| ... | ... | ... | ... | ... |

Figure 2:
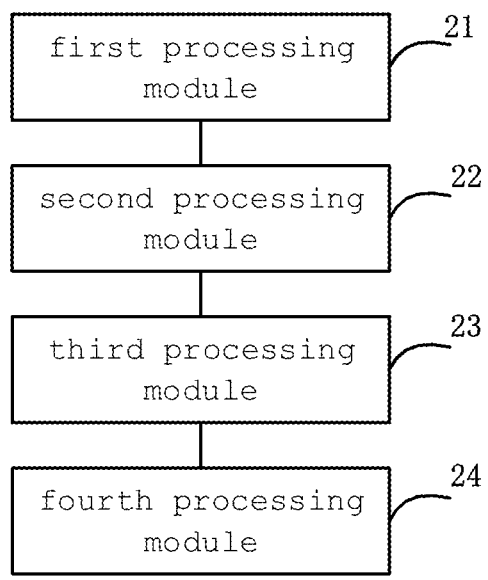
FIG. 2 is a schematic structural diagram of an information acquiring apparatus according to one embodiment of the present disclosure.

FIG. 2 is a schematic structural diagram of an information acquiring apparatus according to one embodiment of the present disclosure. As shown in FIG. 2, the information acquisition apparatus comprises a first processing module 21, a second processing module 22, a third processing module 23, and a fourth processing module 24.

The first processing module 21 is configured to sequentially acquire video frames captured by a video capturing equipment, and detect whether a pedestrian exists in the video frame by using the first deep-learning model.

For example, the video capture device is a camera for capturing video information of a concerned area in front of a designated shelf.

For example, the first deep-learning model is a CNN, Faster-RCNN, YOLOv3 model, and the like.

The second processing module 22 is configured to process the video frame by using a second deep-learning model to generate a pedestrian bounding box of the pedestrian under a condition that the pedestrian exists in the video frame, and assign a corresponding pedestrian identifier to the pedestrian bounding box.

For example, the second deep-learning model is a multi-layered CNN model.

In some embodiments, the second processing module 22 identifies pedestrian feature information within the pedestrian bounding box by using the second deep-learning model and retrieves whether the pedestrian feature information is already comprised in the pedestrian feature library. And under a condition that the pedestrian feature information is not comprised in the pedestrian feature library, the pedestrian feature information is written into the pedestrian feature library, and a new pedestrian identifier is assigned to the pedestrian bounding box.

In addition, under a condition that the pedestrian feature information is already comprised in the pedestrian feature library, the second processing module 22 assigns the pedestrian identifier associated with the pedestrian feature information in the pedestrian feature library to the pedestrian bounding box.

In some embodiments, under a condition that there is no pedestrian in the video frame, the first processing module 21 discards the video frame. By discarding video frames without pedestrians, the computational burden can be effectively reduced.

The third processing module 23 is configured to identify an image in the pedestrian bounding box by using a third deep-learning model to identify feature information of the pedestrian.

For example, the third deep-learning model is a multi-layered CNN model.

In some embodiments, the feature information of the pedestrian comprises attribute feature information and behavior feature information of the pedestrian.

For example, the attribute feature information of the pedestrian comprises at least one of a gender of the pedestrian, an age of the pedestrian, a clothing of the pedestrian and an appearance features of the pedestrian. The behavior feature information of the pedestrian comprises at least one of walking, staying, taking, putting back and holding.

The fourth processing module 24 is configured to write a pedestrian historical data into a database, wherein the pedestrian historical data comprises a timestamp of the video frame, an identifier of the video frame, coordinate information of the pedestrian bounding box, the pedestrian identifier and the feature information of the pedestrian.

In some embodiments, after the pedestrian historical data is written into the database, the data is subjected to deduplication processing in a time dimension and a space dimension to reduce a storage space occupied by the database.

In some embodiments, the pedestrian historical data in the database is grouped by pedestrian identifier. And a first deduplication processing is performed on each group of pedestrian historical data to retain only one piece of pedestrian historical data in a plurality of pieces of pedestrian historical data which have same feature information and have intervals between the timestamps of video frames smaller than a time threshold.

For example, the pedestrian historical data in the database is grouped by the pedestrian identifier, such that the pedestrian historical data in each group has the same pedestrian identifier. Next, the pedestrian historical data in each group is sorted by the timestamp of the video frame, and pieces of data having a time interval smaller than a predetermined threshold (for example, 500 ms) are regarded as corresponding to the same action. In this case, only one of the pieces of data is retained. For example, the last pedestrian historical data collected is retained.

In some embodiments, the pedestrian historical data in the database is grouped by the generation time of the video frames. And a first deduplication processing is performed on each group of pedestrian historical data to retain only one piece of pedestrian historical data in a plurality of pieces of pedestrian historical data which have same feature information and have intervals between the timestamps of video frames smaller than a time threshold.

For example, the pedestrian historical data in the database are grouped according to the generation time of the video frame such that the pedestrian historical data in each group are generated at the same time. Next, in each group, the center position of the pedestrian bounding box in each pedestrian historical data is calculated, respectively. For a plurality of pieces of pedestrian historical data in which the distance between the center positions of the pedestrian bounding boxes is less than a predetermined threshold, it may be regarded as a repeated pedestrian bounding box. In this case, only one of the pieces of data is retained. For example, the last pedestrian historical data collected is retained.

Figure 3:
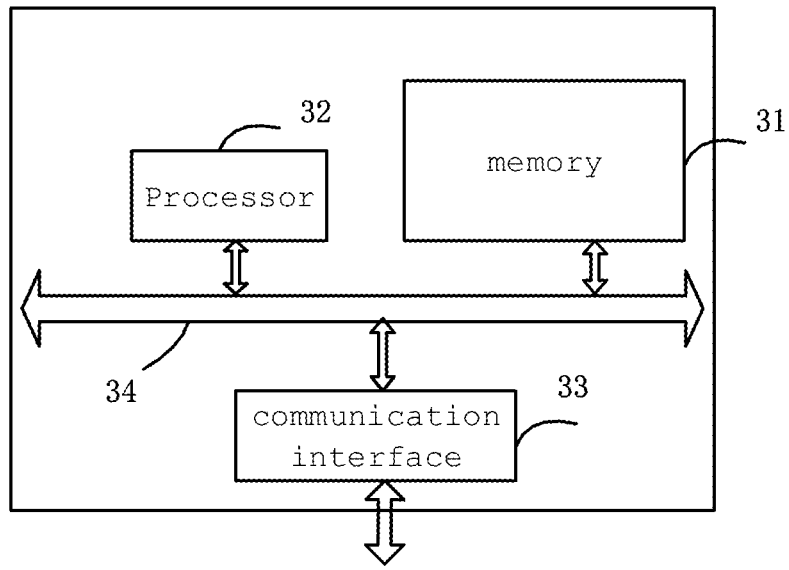
FIG. 3 is a schematic structural diagram of an information acquiring apparatus according to another embodiment of the present disclosure.

FIG. 3 is a schematic structural diagram of an information acquiring apparatus according to another embodiment of the present disclosure. As shown in FIG. 3, the information acquiring apparatus comprises a memory 31 and a processor 32.

The memory 31 is used for storing instructions, the processor 32 is coupled to the memory 31, and the processor 32 is configured to perform the method according to any of the embodiments in FIG. 1 based on the instructions stored in the memory.

As shown in FIG. 3, the information acquiring apparatus further comprises a communication interface 33 for information interaction with other devices. Meanwhile, the information acquiring apparatus further comprises a bus 34, and the processor 32, the communication interface 33, and the memory 31 communicate with each other through the bus 34.

The memory 31 may comprise high-speed RAM memory, and may also comprise a non-volatile memory, such as at least one disk memory. The memory 31 may also be a memory array. The storage 31 may also be partitioned into blocks, and the blocks may be combined into virtual volumes according to certain rules.

Further, the processor 32 may be a central processing unit CPU, or may be an application specific integrated circuit ASIC, or one or more integrated circuits configured to implement embodiments of the present disclosure.

The present disclosure also relates to a non-transitory computer-readable storage medium, in which computer instructions are stored, and when executed by a processor, the instructions implement the method according to any one of the embodiments in FIG. 1.

Figure 4:
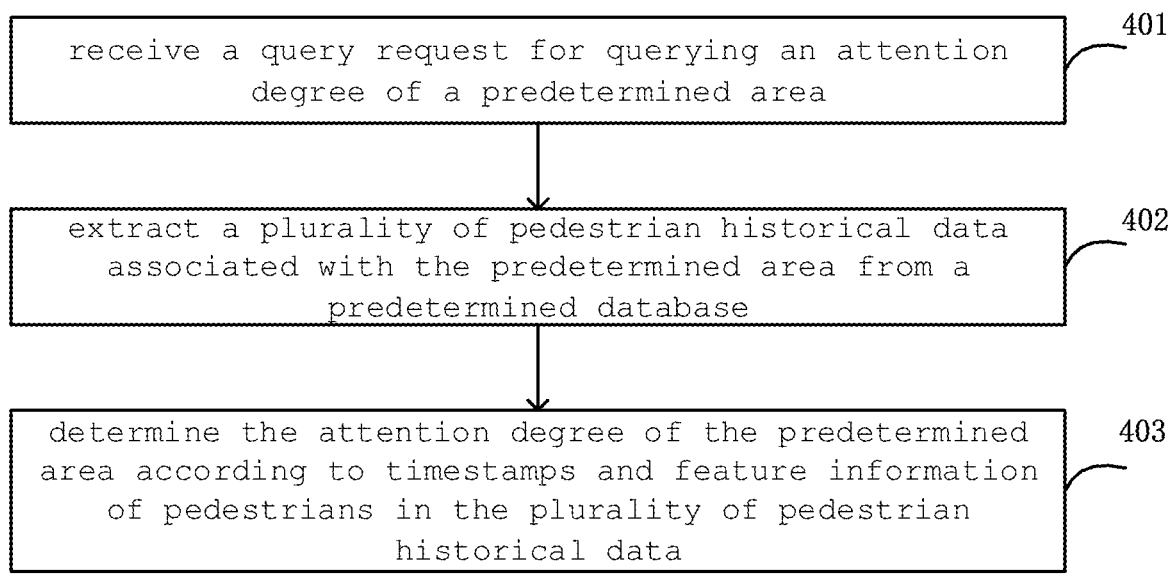
FIG. 4 is a schematic flow diagram of an attention degree detecting method according to one embodiment of the present disclosure.

FIG. 4 is a schematic flow diagram of an attention degree detecting method according to one embodiment of the present disclosure. In some embodiments, the following steps of the attention degree detecting method are performed by an attention degree detecting apparatus.

In step 401, a query request for querying an attention degree of a predetermined area is received.

In step 402, a plurality of pedestrian historical data associated with the predetermined area from a predetermined database is extracted. The pedestrian historical data comprises a timestamp of a video frame, an identifier of the video frame, coordinate information of a pedestrian bounding box, a pedestrian identifier and the feature information of a pedestrian.

In some embodiments, the feature information of the pedestrian comprises attribute feature information of the pedestrian and behavior feature information of the pedestrian.

In some embodiments, the attribute feature information of the pedestrian comprises at least one of a gender of the pedestrian, an age of the pedestrian, a clothing of the pedestrian and an appearance features of the pedestrian. The behavior feature information of the pedestrian comprises at least one of walking, staying, taking, putting back and holding.

It should be noted that the database used herein is obtained by using the method according to any one embodiment in FIG. 1.

In step 403, the attention degree of the predetermined area is determined according to timestamps and feature information of pedestrians in the plurality of pedestrian historical data.

In some embodiments, a plurality of historical data of pedestrians to be detected are extracted from the plurality of historical data of pedestrians, wherein timestamps in the plurality of historical data of pedestrians to be detected are within a predetermined time range, the number of pieces of feature information of the pedestrians in the pedestrian historical data to be detected is counted, and the attention degree of the predetermined area is determined according to the result of counting.

For example, in the predetermined time range, under a condition that the statistical value of the feature information is larger, it indicates that the attention degree of pedestrians to the predetermined area is higher.

Figure 5:
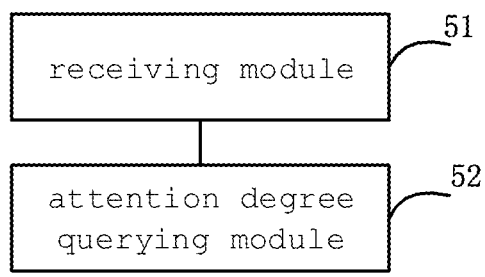
FIG. 5 is a schematic structural diagram of an attention degree detecting apparatus according to one embodiment of the present disclosure.

FIG. 5 is a schematic structural diagram of an attention degree detecting apparatus according to an embodiment of the present disclosure. As shown in FIG. 5, the attention degree detecting apparatus comprises a receiving module 51 and an attention degree querying module 52.

The receiving module 51 is configured to receive a query request for querying an attention degree of a predetermined area.

The attention degree querying module 52 is configured to extract a plurality of pedestrian historical data associated with the predetermined area from a predetermined database, wherein the pedestrian historical data comprises a timestamp of a video frame, an identifier of the video frame, coordinate information of a pedestrian bounding box, a pedestrian identifier and the feature information of a pedestrian, and determine the attention degree of the predetermined area according to timestamps and feature information of pedestrians in the plurality of pedestrian historical data.

In some embodiments, the feature information of the pedestrian comprises attribute feature information of the pedestrian and behavior feature information of the pedestrian.

For example, the attribute feature information of the pedestrian comprises at least one of a gender of the pedestrian, an age of the pedestrian, a clothing of the pedestrian and an appearance features of the pedestrian. The behavior feature information of the pedestrian comprises at least one of walking, staying, taking, putting back and holding.

In some embodiments, the attention degree querying module 52 extracts a plurality of historical data of pedestrians to be detected from the plurality of historical data of pedestrians, wherein timestamps in the plurality of historical data of pedestrians to be detected are within a predetermined time range, the number of pieces of feature information of the pedestrians in the pedestrian historical data to be detected is counted, and the attention degree of the predetermined area is determined according to the result of counting.

For example, in the predetermined time range, under a condition that the statistical value of the feature information is larger, it indicates that the attention degree of pedestrians to the predetermined area is higher.

It should be noted that the database used herein is obtained by using the method according to any embodiment in FIG. 1.

In addition, by utilizing the database, the track and the action of a pedestrian can be tracked, such that fine management of the behavior of the pedestrian can be realized.

Figure 6:
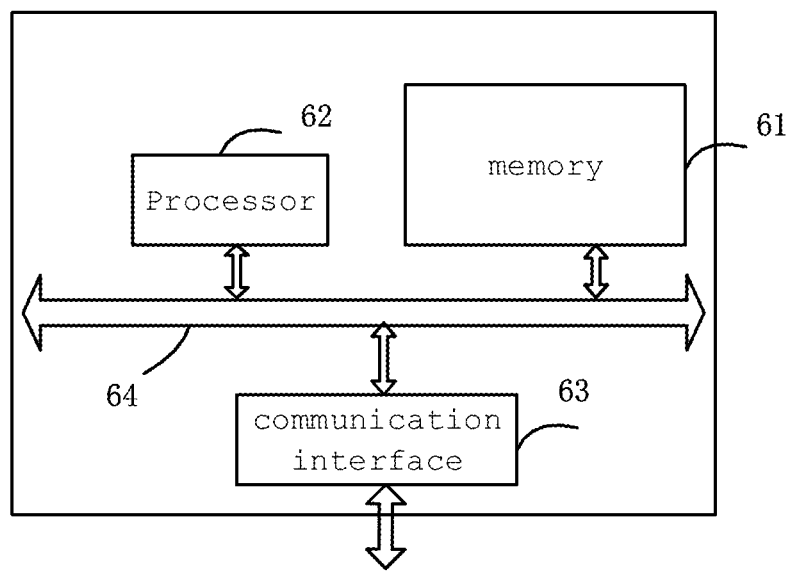
FIG. 6 is a schematic structural diagram of an attention degree detecting apparatus according to another embodiment of the present disclosure.

FIG. 6 is a schematic structural diagram of an attention degree detecting apparatus according to another embodiment of the present disclosure. As shown in FIG. 6, the apparatus comprises a memory 61, a processor 62, a communication interface 63, and a bus 64. FIG. 6 differs from FIG. 3 in that, in the embodiment shown in FIG. 6, the processor 62 is configured to implement the method referred to in any of the embodiments of FIG. 4 based on instructions stored in the memory.

The present disclosure also relates to a non-transitory computer-readable storage medium for storing instructions which, when executed by a processor, implement the method referred to in any one of the embodiments in FIG. 4.

Figure 7:
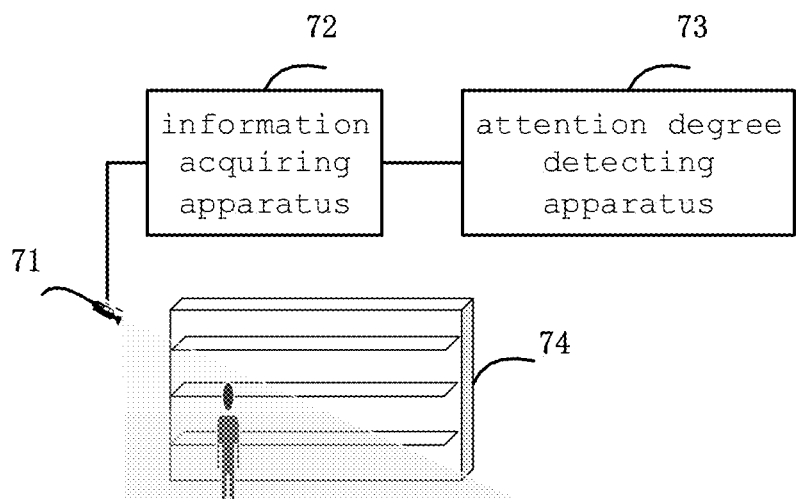
FIG. 7 is a schematic structural diagram of an attention degree detecting system according to one embodiment of the present disclosure.

FIG. 7 is a schematic structural diagram of an attention degree detecting system according to an embodiment of the present disclosure. As shown in FIG. 7, the attention degree detecting system comprises a video capturing equipment 71, an information acquiring apparatus 72, and an attention degree detecting apparatus 73. The information acquiring apparatus 72 is the information acquiring apparatus referred to in any one of the embodiments of FIG. 2 or FIG. 3. The attention degree detecting apparatus 73 is the attention degree detecting apparatus referred to in any one of the embodiments of FIG. 5 or FIG. 6.

The video capturing equipment 71 is configured to capture video information of a predetermined area.

In some embodiments, the video capturing equipment 71 is a camera for capturing video information of a concerned area in front of the shelf 74. Accordingly, whenever a pedestrian walks past the shelf 74 or stops in front of the shelf 74 to perform an action of taking goods or the like, the video capturing equipment 71 performs video capturing accordingly. The information acquisition apparatus 72 performs information acquisition based on the video frames captured by the video capturing equipment 71, and writes the acquired information into the database. The attention degree detecting apparatus 73 determines the attention degree of the predetermined area by using the feature information of different pedestrians in the pred area based on the database.

In some embodiments, the functional unit modules described above can be implemented as a general purpose processor, a programmable logic controller (PLC), a digital signal processor (DSP), an application specific integrated circuit (ASIC), a field programmable gate array (FPGA) or other programmable logic devices, discrete gates or transistor logics, discrete hardware components, or any suitable combination thereof for performing the functions described in this disclosure.

So far, embodiments of the present disclosure have been described in detail. Some details well known in the art have not been described in order to avoid obscuring the concepts of the present disclosure. Those skilled in the art can now fully appreciate how to implement the technical solution disclosed herein, in view of the foregoing description.

Although some specific embodiments of the present disclosure have been described in detail by way of example, it should be understood by those skilled in the art that the above examples are for illustration only and are not intended to limit the scope of the present disclosure. It will be understood by those skilled in the art that various changes may be made and equivalents may be substituted for part of the technical features without departing from the scope and spirit of the present disclosure. The scope of the present disclosure is defined by the appended claims.

What is claimed is:

1. An attention degree detecting system, comprising:
a video capturing equipment configured to acquire video information of a predetermined area;
an information acquiring apparatus comprising:
a first memory configured to store instructions;
a first processor coupled to the first memory, wherein based on the instructions stored in the first memory, the first processor is configured to:
acquire a video frame captured by the video capturing equipment;
detect whether a pedestrian exists in the video frame by using a first deep-learning model;
process the video frame by using a second deep-learning model to generate a pedestrian bounding box of the pedestrian under a condition that the pedestrian exists in the video frame, and assign a corresponding pedestrian identifier to the pedestrian bounding box;
identify an image in the pedestrian bounding box by using a third deep-learning model to identify feature information of the pedestrian, wherein the feature information of the pedestrian comprises behavior feature information of the pedestrian, and the behavior feature information of the pedestrian comprises at least one of taking, putting back or holding; and
write a pedestrian historical data into a database, wherein the pedestrian historical data comprises a timestamp of the video frame, an identifier of the video frame, coordinate information of the pedestrian bounding box, the pedestrian identifier and the feature information of the pedestrian; and
an attention degree detecting apparatus comprising:
a second memory configured to store instructions;
a second processor coupled to the second memory, wherein based on the instructions stored in the second memory, the second processor is configured to:
receive a query request for querying an attention degree of a predetermined area;
extract a plurality of pedestrian historical data associated with the predetermined area from a predetermined database;
extract a plurality of pedestrian historical data to be detected from the plurality of pedestrian historical data, wherein timestamps in the plurality of pedestrian historical data to be detected are within a predetermined time range;
count the number of pieces of feature information of the pedestrians in the pedestrian historical data to be detected; and
determine the attention degree of the predetermined area within the predetermined time range according to the result of counting.

2. The attention degree detecting system according to claim 1, wherein the first processor is further configured to:

group all pedestrian historical data in the database according to the pedestrian identifier to obtain a plurality of first groups after writing the pedestrian historical data into the database; and perform a first deduplication processing on all pedestrian history data in each first group to retain only one piece of pedestrian historical data among a plurality of pieces of pedestrian historical data which have same feature information and have intervals between the timestamps of video frames smaller than a time threshold.

3. The attention degree detecting system according to claim 2, wherein the first processor is further configured to:

group all pedestrian historical data in the database according to a generation time of the video frames to obtain a plurality of second groups after writing the pedestrian historical data into the database; and perform a second deduplication processing on all pedestrian history data in each second group to retain only one piece of pedestrian historical data among a plurality of pieces of pedestrian historical data in which a distance between center positions of the pedestrian bounding boxes is smaller than a distance threshold.

4. The attention degree detecting system according to claim 1, wherein the first processor is further configured to perform the following in order to assign the corresponding pedestrian identifier to the pedestrian bounding box:

identify pedestrian feature information in the pedestrian bounding box by using a second deep-learning model;

retrieve whether the pedestrian feature information is comprised in a pedestrian feature library; and write the pedestrian feature information into the pedestrian feature library under a condition that the pedestrian feature information is not comprised in the pedestrian feature library, and assigning a new pedestrian identifier to the pedestrian bounding box.

5. The attention degree detecting system according to claim 4, wherein the first processor is further configured to perform the following in order to assigning the corresponding pedestrian identifier to the pedestrian bounding box:

assign a pedestrian identifier associated with the pedestrian feature information in the pedestrian feature library to the pedestrian bounding box under a condition that the pedestrian feature information is comprised in the pedestrian feature library.

6. The attention degree detecting system according to claim 1, further comprising wherein the first processor is further configured to:

discard the video frame under a condition that there is no pedestrian in the video frame.

7. The attention degree detecting system according to claim 1, wherein the behavior feature information of the pedestrian further comprises at least one of walking or staying.

8. The attention degree detecting system according to claim 1, wherein the feature information of the pedestrian comprises attribute feature information of the pedestrian.

9. The attention degree detecting system according to claim 8, wherein the attribute feature information of the pedestrian comprises at least one of a gender of the pedestrian, an age of the pedestrian, a clothing of the pedestrian and an appearance features of the pedestrian.

* * * * *